S. H. PIERCE.
DRAFT-EQUALIZER.
No. 187,309. Patented Feb. 13, 1877.
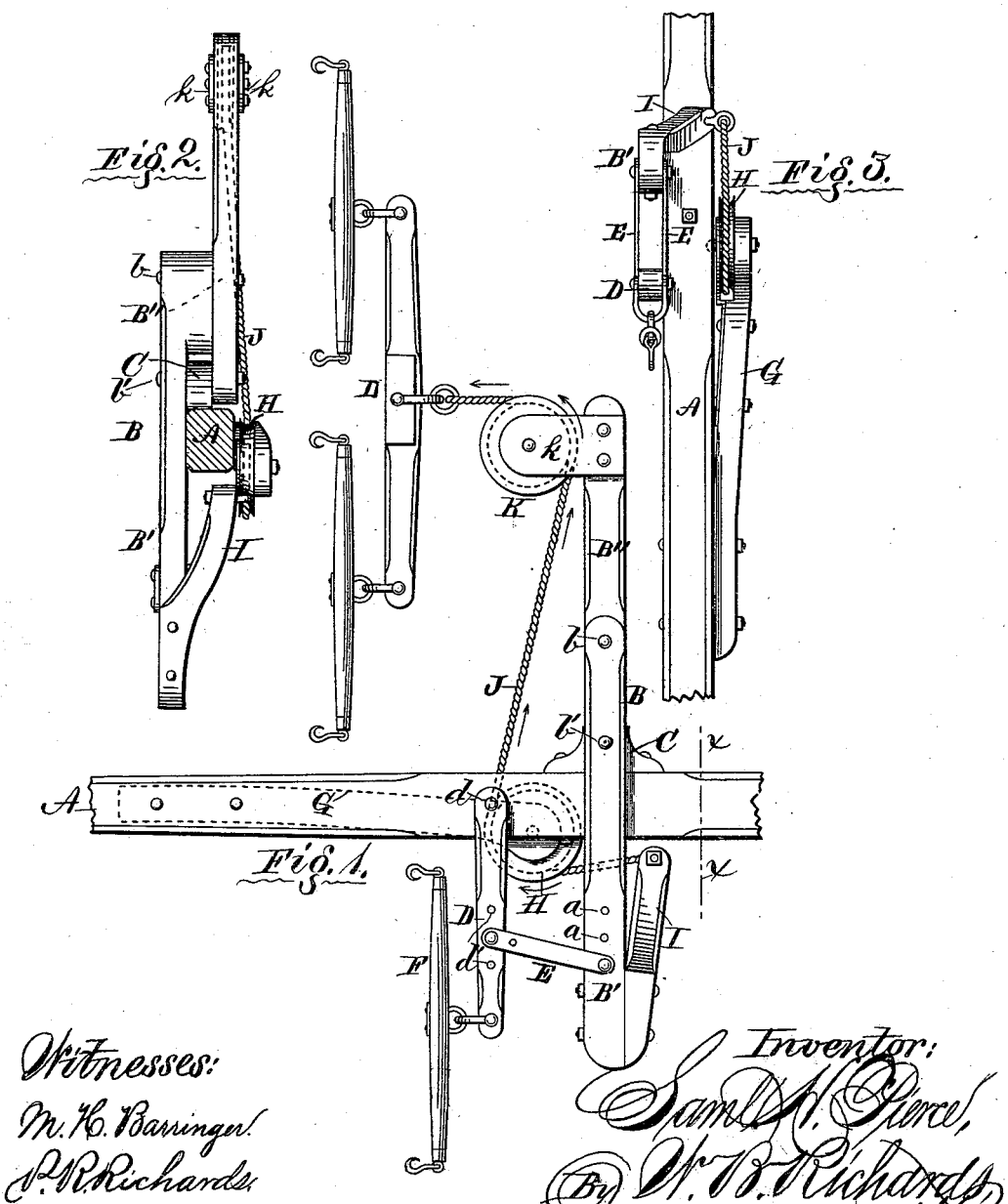

UNITED STATES PATENT OFFICE.

SAMUEL H. PIERCE, OF GALESBURG, ILLINOIS, ASSIGNOR OF ONE-HALF OF HIS RIGHT TO CHARLES TUPPER, OF SAME PLACE.

IMPROVEMENT IN DRAFT-EQUALIZERS.

Specification forming part of Letters Patent No. 187,309, dated February 13, 1877; application filed December 5, 1876.

*To all whom it may concern:*

Be it known that I, SAMUEL H. PIERCE, of Galesburg, in the county of Knox and State of Illinois, have invented certain new and useful Improvements in Draft-Equalizers; and I do hereby declare that the following is a full, clear, and exact description thereof, which will enable others skilled in the art to which it appertains to make and use the same, reference being had to the accompanying drawing, and to letters of reference marked thereon, which form a part of this specification.

My invention pertains to differential draft-bars, or three-horse draft-equalizers of that class in which two draft-animals operate on the longer arm and one on the shorter arm of compound levers; and the invention consists in the use of a cord or chain attached at one end to the short arm of the main lever, and passing over a pulley mounted on the tongue forward of the main lever, thence over another pulley journaled to the outer end of the longer main lever, and carrying attached to its other end double-trees for two draft-animals. Through the instrumentality of said cord and its connections, a portion of the draft of the two animals hitched at one side of the draft-pole may be transferred to operate on the part to which the single animal is hitched, all as hereinafter more fully described, and set forth in the claims hereto annexed.

In the accompanying drawing, Figure 1 is a plan view of my improved device. Fig. 2 is a rear elevation—the tongue in section, in the line $x\ x$ of Fig. 1. Fig. 3 is a side elevation.

Referring to the parts by letters, A represents a tongue or draft-pole; B, the main lever, preferably constructed, as shown more plainly at Fig. 2, of a shorter arm, B', placed above the tongue, and a longer arm, B'', below a block, C, which is secured to one side of the tongue. The arms B' B'' are bolted to each other rigidly by bolts $b\ b'$, the bolt $b'$ being also the pivot-bolt on which the lever B oscillates. D is a lever, pivoted at $d$ to the tongue A, and is adjustably connected, by oblique links E and series of holes $d'$ and $a$, to the short arm B' of the lever B, and has the single-tree F affixed to its outer end for one draft-animal. G is a bar, attached at its forward end well forward and to the under side of the tongue A, (see Fig. 3,) and has a pulley, H, journaled on its rear end, forward of the lever B. I is a lever, attached to the outer end of the arm B' of the lever B, and, extending inward and downward, has secured to its distal end one end of a cord, J, which cord passes thence over the pulley H, and thence over a pulley, K, which is journaled in plates $k$ on the distal end of the arm B'' of the lever B, and has secured to its other end the double-tree L, for attaching two draft-animals. By means of the cord J and its arrangement, a portion of the draft of the two horses is transferred, or made to act in drawing forward on the short arm B' of the lever B, as shown clearly by the arrows at Fig. 1 of the drawings.

The same arrangement of cord, pulleys, levers, and draft-pole, it is believed, may be made to counteract the side draft on the draft-pole arising from the two animals pulling or drawing upon one side thereof, and but one upon the other.

The bars B' B'' may be made in one piece, and may be pivoted to the tongue, and the block C dispensed with, but making them in two pieces brings the pulleys H K in line.

Having thus described my invention, what I claim as new, and desire to secure by Letters Patent, is—

1. The cord J, combined with the lever B and pulleys H and K, substantially as described, and for the purpose specified.

2. The cord J, combined with the compound levers B and D, link E, pulleys H and K, and tongue A, substantially as described, and for the purpose specified.

3. The cord J, combined with the compound levers B and D, link E, tongue A, pulley K, and the pulley H, journaled to the bar G, substantially as described, and for the purpose specified.

4. The cord J, combined with the compound levers B and D, link E, pulleys H and K, tongue A, and lever I, substantially as described, and for the purpose specified.

5. The lever B, constructed in two parts, B' B'', the one placed above and the other below the block C, and combined with the pulleys H and K and cord J, substantially as described, and for the purpose specified.

In testimony that I claim the foregoing as my own I affix my signature in presence of two witnesses.

SAMUEL H. PIERCE.

Witnesses:
 THOMAS McKEE,
 FRANCIS M. TERPENING.